United States Patent
Kirkpatrick et al.

(10) Patent No.: US 6,961,878 B2
(45) Date of Patent: Nov. 1, 2005

(54) SOFTWARE APPLICATION ERROR SEVERITY NOTIFICATION TO USERS

(75) Inventors: Mark A. Kirkpatrick, Conyer, GA (US); Darin J. Morrow, Acworth, GA (US); John A. Strohmeyer, Norcross, GA (US); Charles E. Rittenberry, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 505 days.

(21) Appl. No.: 10/084,484

(22) Filed: Feb. 28, 2002

(65) Prior Publication Data

US 2004/0268188 A1 Dec. 30, 2004

(51) Int. Cl.$^7$ ................................................ G06F 11/00
(52) U.S. Cl. ........................................ 714/57; 379/9.03
(58) Field of Search .............................. 714/4, 46, 48, 714/57; 379/9.02, 9.03

(56) References Cited

U.S. PATENT DOCUMENTS

| | | | | |
|---|---|---|---|---|
| 5,475,838 A | * | 12/1995 | Fehskens et al. | ............. 714/57 |
| 5,673,390 A | * | 9/1997 | Mueller | ........................ 714/57 |
| 2002/0178404 A1 | * | 11/2002 | Austen et al. | ................ 714/43 |
| 2003/0074601 A1 | * | 4/2003 | Schultz et al. | ................ 714/15 |

* cited by examiner

Primary Examiner—Robert Beausoliel
Assistant Examiner—Gabriel L Chu
(74) Attorney, Agent, or Firm—Walters & Zimmerman; Jennifer Medlin; Todd Mitchem (57) ABSTRACT

A system and method for a monitor process is disclosed. The monitor process manages, directs, and retains a record of the output from software applications and the tasks associated with such output. The monitor process does so by determining which notification messages output by the software applications do not match notification messages stored within a system monitor's message database. The monitor process then analyzes the non-matching notification messages using a rule set to determine an appropriate severity and contact list for each message. The monitor process then relays the non-matching notification messages to members of the contact list along with the message's appropriate severity. The monitor process may also be used to assist and encourage members of the contact list to update the system monitor's message database with the non-matching notification messages.

13 Claims, 8 Drawing Sheets

SOFTWARE APPLICATION ERROR SEVERITY NOTIFICATION TO USERS

BACKGROUND

1. Field of the Invention

The present invention relates generally to diagnostics in computer information systems. More specifically, the present invention relates to systems and methods for retaining a record of and managing output from software applications (as well as directing tasks associated with such output).

2. Background of the Invention

The Regional Bell Operating Companies (RBOCs) use hundreds of computer software applications to manage everything from repair crews to requests for telephone service. Many of these software applications, such as 102, 104, and 106 of FIG. 1, generate notification messages.

A software application generates notification messages for many reasons, but most often to alert technicians that the software application has erred or has encountered some error. In these cases, the notification messages are intended to alert certain technicians whose task it is to make sure the software application runs properly.

To aid the technicians, most software applications store each notification message into an output file so that the technicians can read and have a record of the errors created or encountered by a particular software application.

Figure 1:
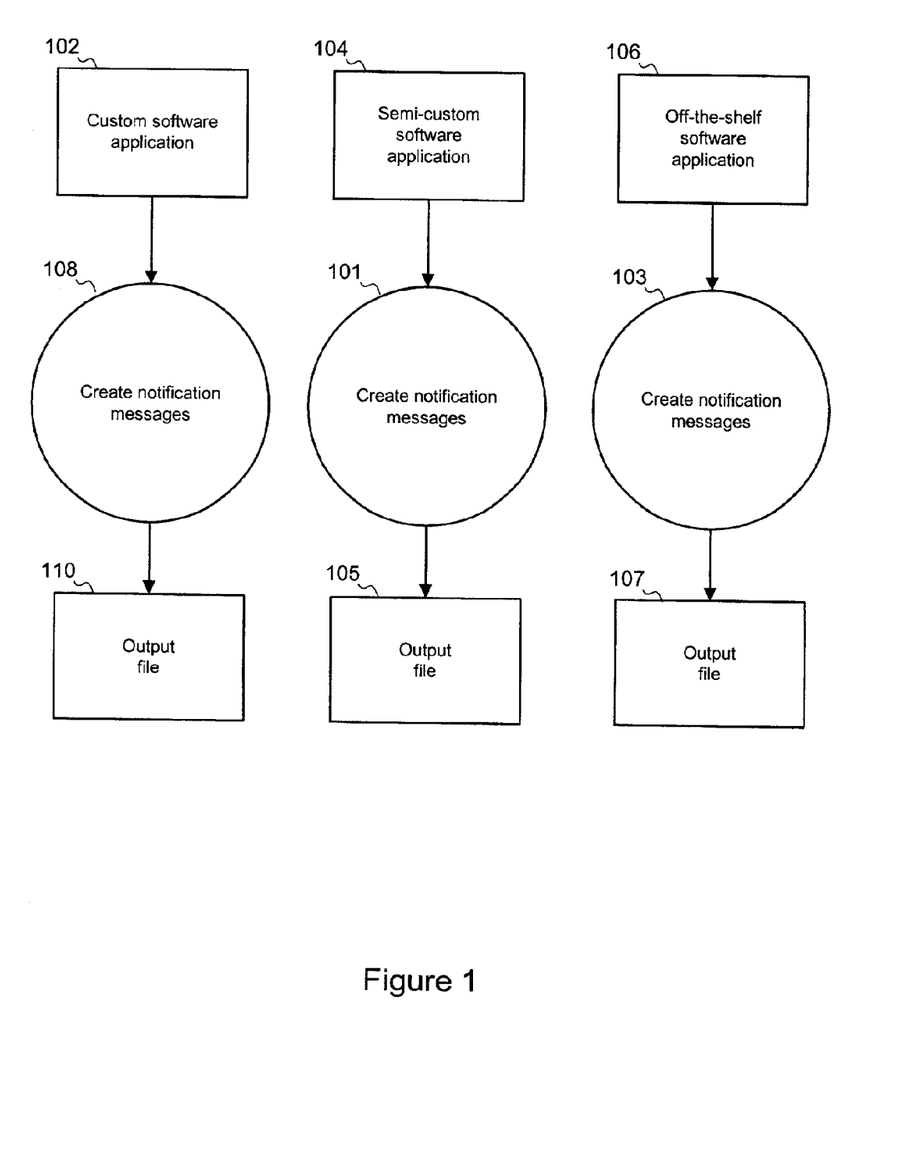
FIG. 1 is a flow diagram of an output file generation process showing the present state of the art.

Using FIG. 1 as an example, if software application 102, 104, or 106 generates a notification message, shown at steps 108, 101, or 103, respectively, it or some other program stores the notification message into an output file 110, 105, or 107, respectively.

While the output file aids the technicians by recording the notification messages from the software application, to be optimally useful, a technician must constantly track the output file or the errors may go unattended. Usually, however, a technician is not sitting in front of a screen, constantly reading over the output file, waiting for each new notification message to arrive.

To fix this problem, most of the RBOCs use system monitors. A system monitor is another software application that monitors the output files. Some system monitors send an email to technicians containing the text of each notification message as soon as the notification message is generated by the software application and added to the output file. This type of system monitor helps alert the technicians, but the technician still must be at his or her computer to receive the notification message or an error may go unattended.

Moreover, this type of system monitor bombards technicians with huge numbers of notification messages—every notification message generated by monitored software applications. Because most of these notification messages are not important, technicians must review many useless emails, and can lose track of important messages that are among a sea of unimportant ones. In short, this type of system monitor is disadvantageous because it does not clarify which notification messages are important.

To correct this failure, programmers designed system monitors to include message databases, usually one database for every software application for which the system monitor was intended to monitor (by monitoring that software application's output file). The system monitors use these message databases to separate the important from unimportant notification messages.

Figure 2:
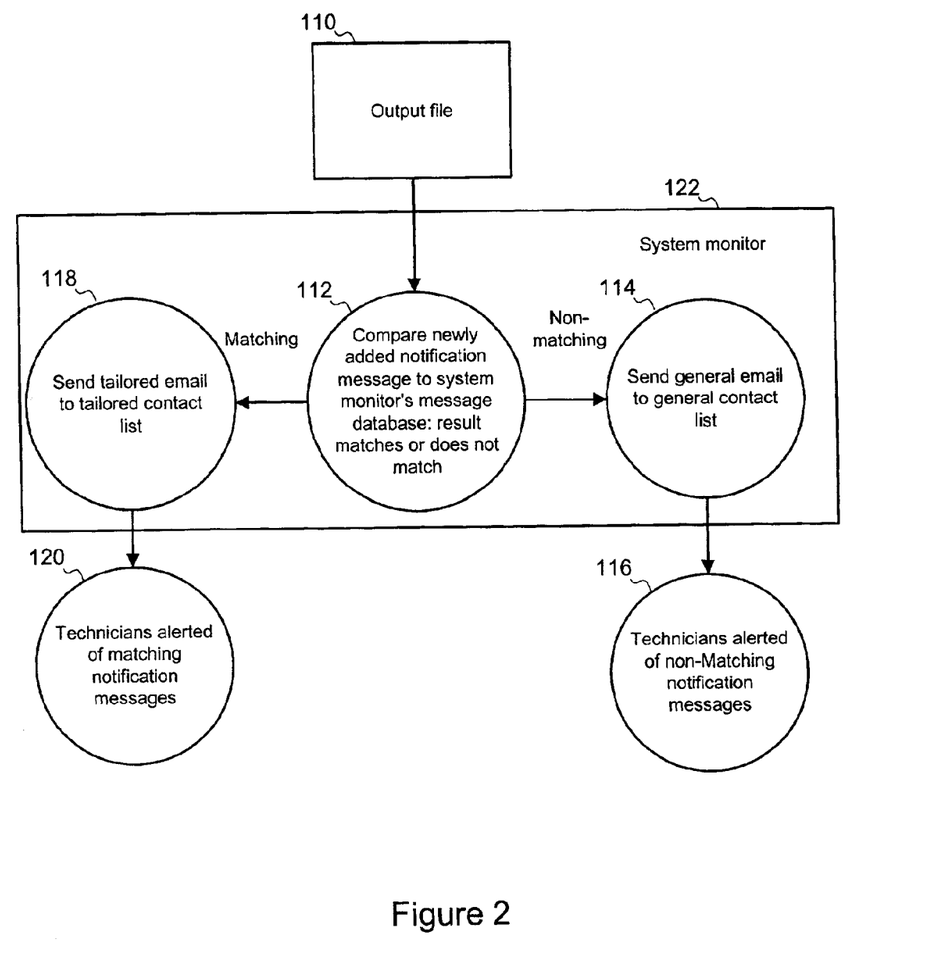
FIG. 2 is a flow diagram of a system monitor process showing the present state of the art.

Using FIG. 2 as an example, system monitor 122 contains message databases, which system monitor 122 uses by comparing each notification message in output file 110, 105, or 107 against notification messages previously recorded into the message database (shown in process step 112). When comparing, system monitor 122 uses just the message database corresponding to the software application that generated the notification message. Thus, system monitor 122 may contain multiple system monitor message databases, each containing notification messages that can be generated by a particular software application, such as 102, 104, or 106 of FIG. 1.

Each system monitor message database typically contains the text of the notification messages that the software application to which it corresponds could generate, but only contains those notification messages that the software application could generate at the time the message database was completed. With every update, bug fix, or other change to the software application to which the message database corresponds, the messages database becomes more and more out of date—no longer containing all of the notification messages that the software application can generate.

For notification messages a software application generates of which a message database contains a copy, however, the system monitor can determine whether or not those notification messages are important or unimportant. As an example, system monitor 122 in FIG. 2 does so by comparing each notification message contained in output file 110, 105, or 107 against the related system monitor message database. If the newly generated notification message matches an identical notification message contained within the message database, system monitor 122 accesses information associated with that identical notification message from the message database. This information informs system monitor 122 of whether or not the notification message is important (see process 112).

For example, if the notification message is "error 24: disk memory almost full" and the system monitor message database contains an identical notification message "error 24: disk memory almost full", system monitor 122 learns all information stored in the message database corresponding to that exact notification message. System monitor 122 could learn that it should alert a certain person and that the notification message is of a particular importance (also called severity). Thus, system monitor 122 could send an email to that certain person according to process 1118 (technician number 4 at technician4@RBOC.com, for instance) alerting the technician, according to step 120, of the severity of the error to which the notification message, "error 24: disk memory almost fall" refers.

System monitors are only able to alert technicians of the importance of a particular notification message if the applicable message database contains a notification message identical to that particular notification message. Without information from a message database, a system monitor must guess as to the notification message's severity and to whom to send an alert.

The system monitor will have less and less information from the message database as the message database gets out of date. The message database gets out of date over time as the software application that the message database relates to changes. The software application can change through bug fixes, updates, upgrades, and in other ways.

The system monitor also will not have information from the message database for inaccuracies in the message database.

For every notification message that is generated by the software application for which the message database does not have an exact match, the system monitor will fail to provide a good estimate of the severity of such non-matching notification messages, and will fail to provide a good estimate of who to send an alert regarding such non-matching notification messages.

Using FIG. 2 as an example, for notification messages without a match in a message database, system monitor 122 can only send out a general email, without a meaningfully choosing a severity, to a general contact list of technicians, as shown in step 114. While the technician is alerted, step 116, of a the notification message, the alert is one of many such general emails bombarding the technicians; the technicians must spend considerable time reviewing these general emails. This is because the technician cannot determine which email is important without reading through them.

Even worse, most technician receive notification messages from more than one software application—sometimes dozens of software applications and multiple system monitors—further bombarding the technician with general emails with nothing but the text of the notification message and an average or general severity level. This requires the technician to read the emails and, unless the technician is unusually diligent, causes many important notification messages to go unattended. When notification messages go unattended, errors discovered by or occurring in the software application generating the notification messages may cause the software application to fail, sometimes causing substantial losses or interruptions to the business.

Because system monitor 122 must sent out an alert to a general contact list for every non-matching notification message, the email goes to too many technicians or fails to go to the right technicians. By doing so, system monitor 122 fails to direct notification messages to the technician most likely to be responsible for and capable of fixing the error.

The process shown in FIG. 2 of monitoring notification messages also fails in another manner; it fails to adequately encourage and assist technicians who fix an error to update the applicable message database used by the system monitor. In this process, there is no feedback system requiring and encouraging technicians to update the system monitor message database. The technicians are also disincentivized to update the applicable system monitor message database because in the current process, it must be done by hand by opening up the system monitor message database and carefully typing in the notification message, new severity, and new email list.

Even when the technician does update the applicable message database, it is an inefficient process. First, the technician may have to wait until the system monitor is no longer using the particular system monitor message database, increasing the chance that the technician will forget important information by the time that window of opportunity opens. Second, the technician must record all the relevant information relating to fixing the error without prompting or assistance. Because of this, the technician may fail to retain all of the information pertinent to the update. Third, the process is inefficient because it requires the technician to reenter the information into the system monitor message database that the technician recorded earlier, wasting the technician's time.

SUMMARY OF THE INVENTION

The present invention addresses the problems described above by providing systems and methods for managing output. A preferred embodiment of a system and method according to the invention is referred to herein as the monitor process. The monitor process manages, directs, and retains a record of the output from software applications and the tasks associated with such output by: relaying notification messages from software applications that do not match a notification message within an applicable monitor process software message database; analyzing such non-matching notification messages using a rule set to determine an appropriate severity and contact list; relaying to members of the contact list the text of the non-matching notification message and its appropriate severity; and assisting and encouraging one or more members of the contact list to update the applicable system monitor message database with such non-matching notification message.

By so managing this output, tasks, and the groups performing such tasks, the monitor process directs each non-matching notification message to fewer, better-suited technicians. The monitor process does so by analyzing the text of the non-matching notification message.

Also through analyzing the text of the non-matching notification message, the monitor process usually sets an accurate severity level, thereby setting out the important messages from many unimportant ones.

Further, the monitor process systematizes the actions of the technicians, allowing the technicians to consistently handle how the technicians respond to non-matching notification messages through a user interface.

Further still, the monitor process assists and encourages technicians to update the applicable system monitor message database with such information by alerting the technicians and others that the system monitor message database has not been updated, as well as recording such failure to update.

The monitor process also assists and encourages technicians by giving the technician an easy-to-use graphical user interface to record information and update the system monitor message database. When the technicians record information on how they fixed an error, its importance, and who should be notified, especially as they are fixing the error, valuable information is not lost. Once recorded, the monitor process can use some or all of this information to automatically update the applicable system monitor message database, saving technicians from having to manually update such database.

Finally, the monitor process also increases the efficiency of the technicians updating a system monitor message database by automatically updating the applicable system monitor message database when technicians would otherwise have to wait for the database to be available for changes. Because the monitor process can accept the proposed update to the system monitor message database at any time and can later export such update when the window opens for updates to the applicable system monitor message database, such updates can more efficiently be completed.

The present invention not only may be applied as set forth in the preferred monitor process embodiment, it may also be applied in many other ways. One example of such a way is through updating any database by analyzing data from an output file, involving another group or application to further alter the data from the output file, and exporting such updated data to replace outdated data within the database.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims, and the drawings.

BRIEF DESCRIPTION OF THE DRAWINGS

The accompanying drawings, which are incorporated in and form a part of the specification, illustrate preferred embodiments of the present invention and, together with the written description, serve to explain the principles of the invention. In the drawings.

DETAILED DESCRIPTION

Reference will now be made in detail to preferred embodiments of the invention, non-limiting examples of which are illustrated in the accompanying drawings and/or described below.

Figure 3:
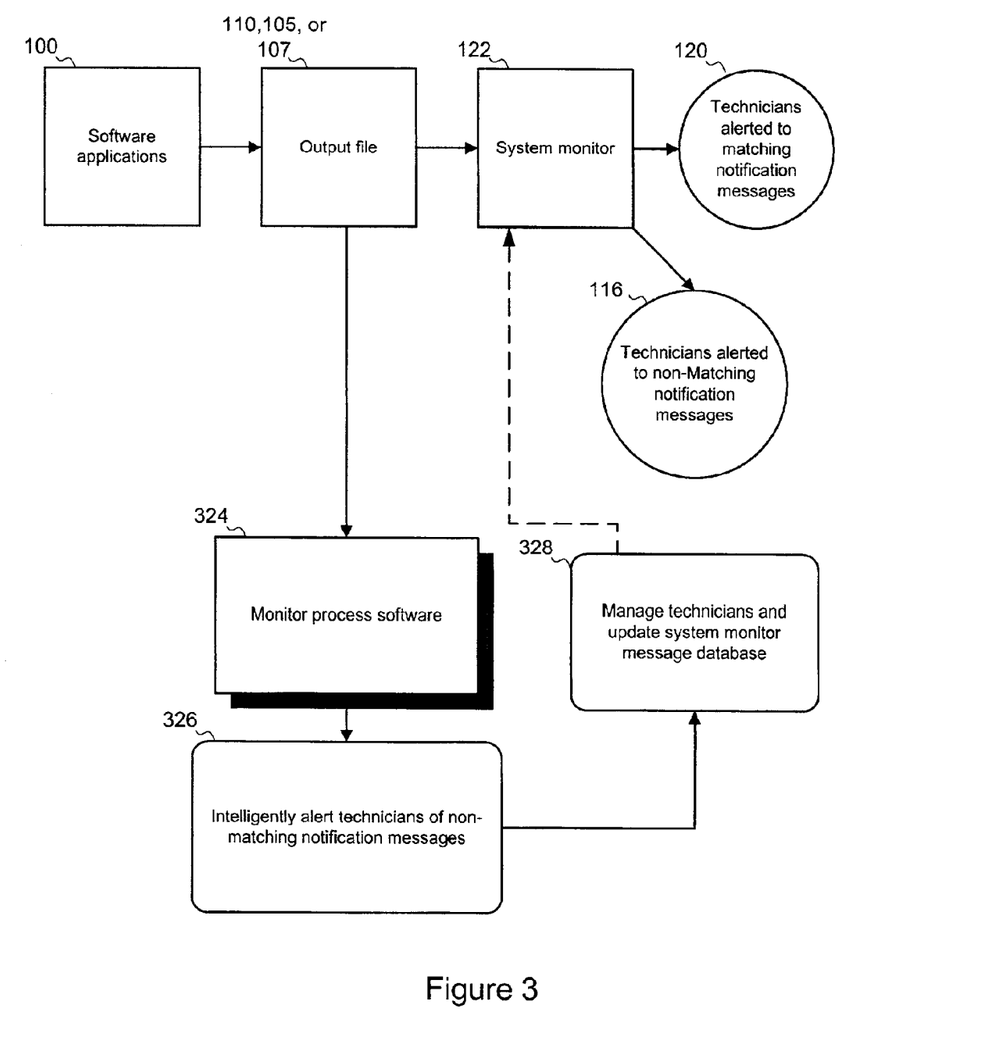
FIG. 3 is a flow diagram of a preferred embodiment of the output file generation process, the system monitor process, and a monitor process in accordance with the present invention.

With reference to FIG. 3, methods and systems according to the preferred embodiments of the invention will now be described. One system and method according to a preferred embodiment of the invention comprises a monitor process, which handles output. The monitor process handles output, preferably from software applications. The monitor process preferably compares output. Further, the monitor process preferably manages the process and tasks associated with such output.

In this preferred embodiment, the outputs managed by the monitor process are human-readable messages intended to notify technicians (notification messages) of errors encountered by software applications 100. These notification messages generated by software applications 100 preferably are fed into and recorded in an output file 110, 105, or 107, assuming that there are three software applications within software applications 100. System monitor 122 compares each notification message with a system monitor message database. Monitor process software 324 compares each notification message of output file 110, 105, or 107 against a monitor process message database. Monitor process software 324 preferably imports each notification message from output file 110, 105, or 107 using an import module. Monitor process software 324 preferably compares each new notification message added to output file 110, 105, or 107 to one or more monitor process message databases using a comparison module.

System monitor 122 contains one or more databases, each database matching each particular software application 100 so that the notification messages generated by a particular software application 100 can be compared to a message database containing notification messages known to be generated by that software application 100.

Monitor process software 324 also contains one or more databases. These databases do not have to match each particular software application 100. Preferably, however, monitor process software 324 contains multiple message databases, each database matching each particular software application 100 so that the notification messages generated by a particular software application 100 can be compared to a message database containing notification messages known to be generated by that software application 100.

System monitor 122 compares each notification message with an appropriate message database and then sends an alert to technicians, as shown in FIG. 2. System monitor 122 alerts technicians to notification messages that do and do not match a notification message within system monitor 122's message database for the applicable software application 100, as set forth in process 116. But such alerts for non-matching notification messages are not very useful.

As stated in the summary of the invention section above, alerts generated for non-matching notification messages as part of the inventive monitor process are very useful. Monitor process software 324 compares each new notification message with an appropriate message database, generates a estimated severity level for the notification message, and alerts (preferably using an alert module) the notification message and the severity level to a list of technicians chosen to be the best technicians to which to send the alert. These estimated severity levels and chosen technician contact lists, along with other novel features, will be disclosed in greater detail below and described in FIG. 5.

Also with reference to FIG. 3, the monitor process also manages technicians, as shown in step 328, so that the feedback message database used by monitor process software 324 and system monitor 122 will be updated to include notification messages found to be non-matching as part of the monitor process. This process shall be discussed in more detail below.

Figure 4:
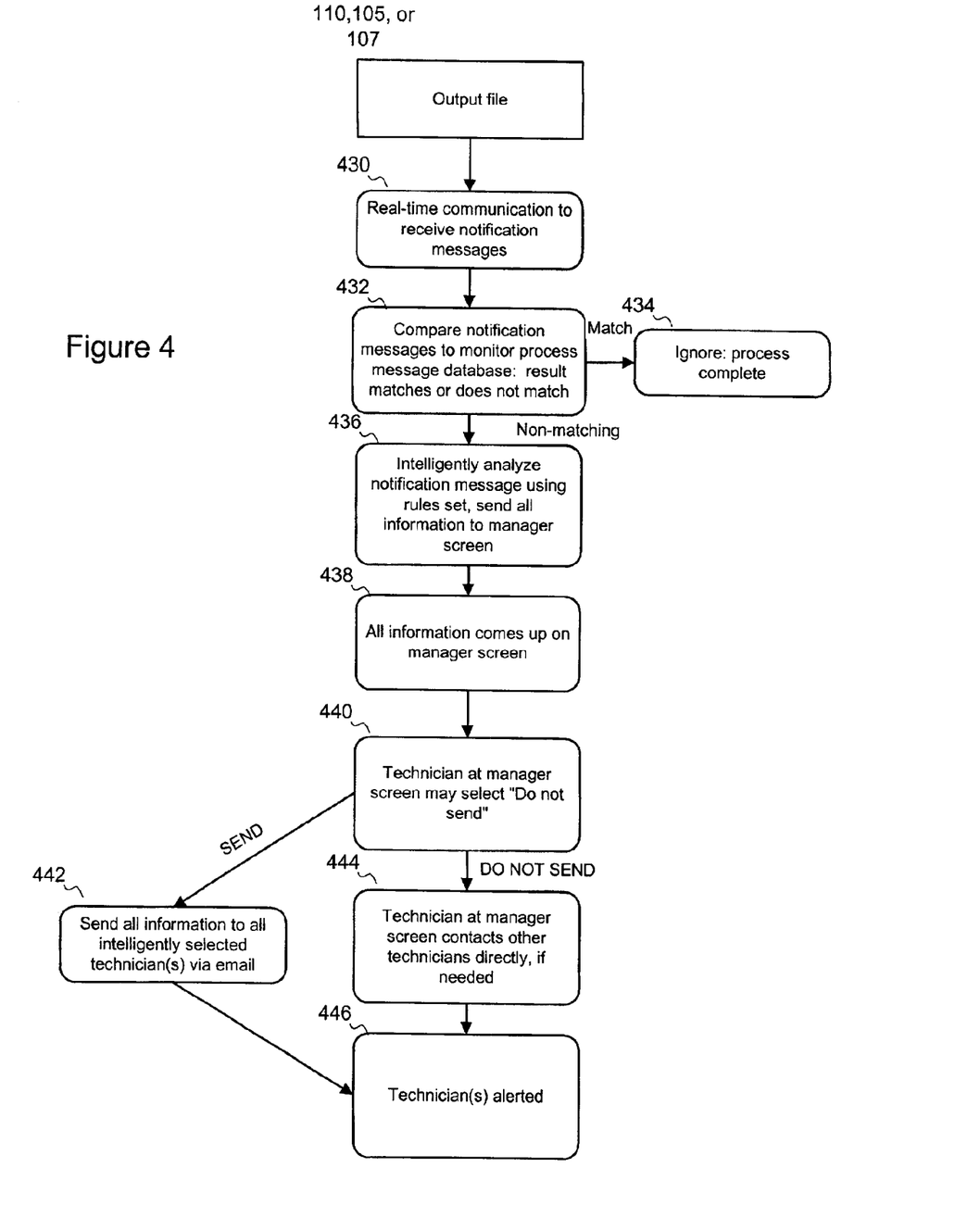
FIG. 4 is a flow diagram of a preferred embodiment of an output handling process in accordance with the present invention.

With this basic overview in place, FIG. 4 will now be described. FIG. 4 sets forth a preferred embodiment of a process by which monitor process software 324 gains, compares, and manages notification messages of output file 110, 105, or 107. As part of the monitor process, monitor process software 324 communicates with output file 110, 105, or 107, preferably in real-time and continuously. Through this communication, shown in process step 430, monitor process software 324 receives each new notification message added to output file 110, 105, or 107 by each software application (described in FIGS. 1 and 2 as 100, 102, 104, and 106) that generates messages to one or more output files 110, 105, and/or 107.

With each new notification message, monitor process software 324 compares the notification message to the feedback message database used by monitor process software 324 for the software application that generated the notification message. If monitor process software 324 compares the notification message (step 432) and it is an identical, perfect match for a notification message stored in the applicable feedback message database, monitor process software 324 ignores the notification message (step 434) except to record in an audit file that such notification message was generated.

If monitor process software 324 compares the new notification message (step 432) and it is not a perfect match for a notification message stored in the applicable feedback message database, monitor process software 324 compares the non-matching notification message using a rule set to determine an appropriate severity and contact list according to step 436.

As part of the monitor process, monitor process software 324 contains a rule set. This rule set helps monitor process software 324 differentiate between important notification messages (those which should be set to a high severity) and those that are not important (these should be set to a low severity), and every severity level in between. The rule set does so by knowing, preferably based on software applications generally and more preferably with regard to the software application that generated the notification message, that certain human-readable text within the notification message has a certain meaning.

For instance, when the word "disk" is in the text of a notification message, it generally denotes an important problem, such that the notification message should have its severity set to a high level. The word "disk" is important because it is often part of larger textual strings such as "disk drive almost full" and the like. The rule set is sophisticated; it can change the severity of the non-matching notification message that would be set by one word or phrase alone, such as "disk," by lowering or raising this severity due to another word of a certain importance, such as "non-critical," thereby creating an ascertained severity for the non-matching notification message.

The rule set may also be used to analyze certain numbers or other text, most often with a severity known because of the number's use in a specific software application. The severity level set in this manner can be in numerical or textual format and can be switched back and forth between them as shown in related patent application entitled, "System and Method for Interfacing With a System Monitor," filed Dec. 31, 2001, U.S. patent application Ser. No. 10/029, 799.

Also as part of the monitor process, the rule set for monitor process software 324 preferably is used to determine who the monitor process should alert. Using the rule set, monitor process software 324 can create a contact list of technicians and others to alert of the non-matching notification message, as shown in step 436. The rule set is useful in this fashion also because it contains the names and contact information for many persons, each person relating to particular terms or numbers, so that when these terms or numbers arise in a non-matching notification message, particular persons' names and contact information are compiled by monitor process software 324.

For the contact list to be most accurate, the rule set should either be dedicated to the particular software application that generated the non-matching notification message at issue, or should include a set of data within the rule set dedicated to such software application. The contact list can be generated without such a dedicated aspect of a rule set or entire rule set, but in such cases the contact list may suffer inaccuracies.

For example, without a dedicated rule set or aspect thereof, the rule set may include a rule stating that all non-matching notification messages containing the word "disk" should be sent to the technician(s) in charge of the disk space used by all of the software applications being monitored by monitor process software 324. But with a dedicated rule set or aspect thereof, a more-accurate contact list may be possible if, for example, there are certain technician(s) knowledgeable about "disk"-related problems attributable to just the software application that generated the notification message.

Returning to a discussion of how the rule sets are used, multiple words, phrases, and numbers may be used by monitor process software 324 to set the contact list, similar to the how the rule sets are used to determine severity.

Continuing with the description of the process set forth in FIG. 4, in process step 438, all of this pertinent information, including members of the contact list, the notification message's severity, and any other information are communicated to a technician, preferably one actively responsible for operations of system monitor 122 and monitor process software 324. This information is preferably communicated through display on a manager screen of a graphical user interface according to step 438, more preferably comprising a table on a scrollable window within the manager screen.

Once the information is available to a technician either via email, phone, or otherwise but preferable through the manager screen, the technician may, within a certain time period, select that monitor process software 324 refrain from notifying the members of the contact list, as set forth in step 440. If the technician commands monitor process software 324 to refrain from sending the other information to the members of the contact list, the technician will notify whomever is needed to fix the problem to which the non-matching notification message refers, if necessary, according to step 444. If the technician is not available, or otherwise does not select monitor process software 324 through the manager screen at 440 or otherwise to refrain from contacting the members of the contact list with the time period, monitor process software 324 will send an email, page, or otherwise contact the members of the contact list (step 442), either all at once or in ascending order until all members have been contacted or monitor process software 324 is commanded to refrain from contacting members.

At the completion of the above process steps, technician(s) are alerted to the non-matching notification message with accompanying estimated severity level and other pertinent information (such as time non-matching notification message was generated by software application 100, the text of the non-matching notification message, if the message is being generated repeatedly, and etc.).

Figure 5:
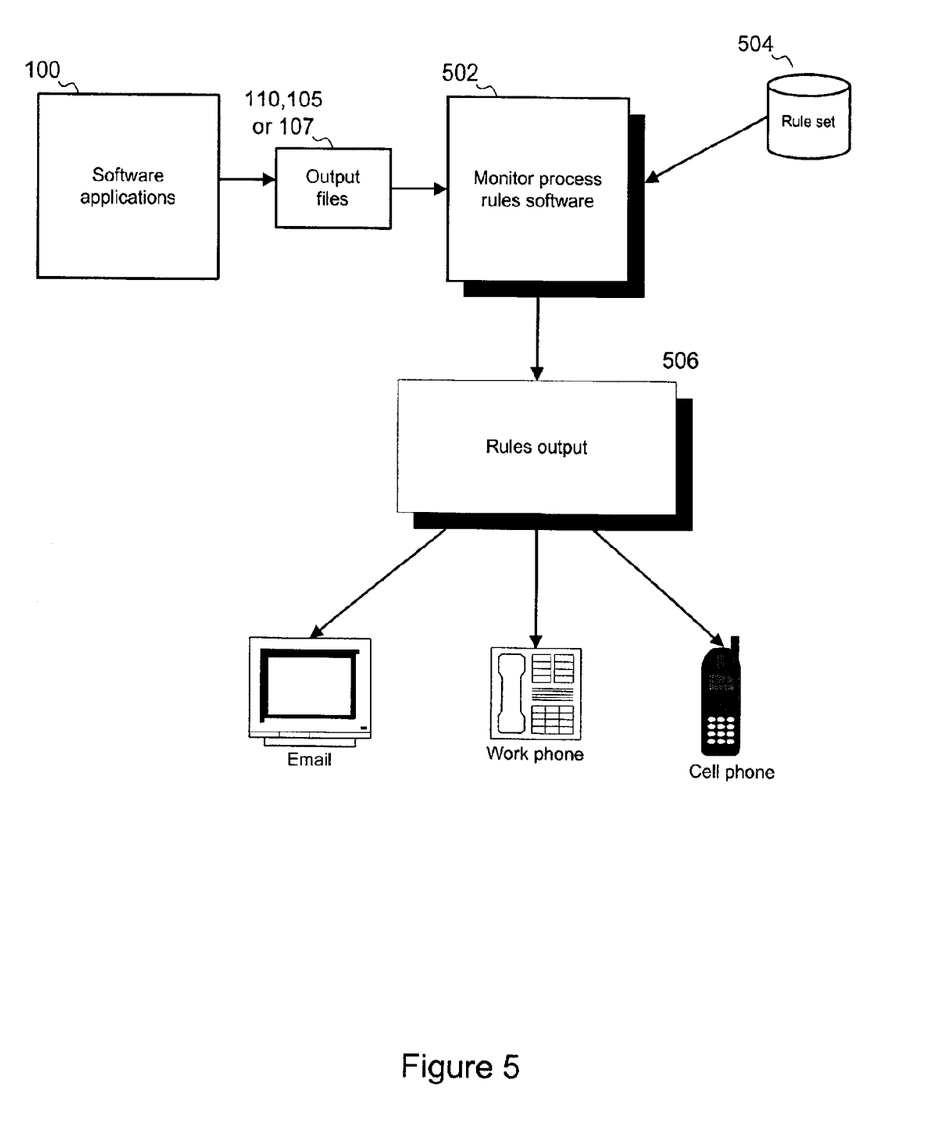
FIG. 5 is a flow diagram of a preferred embodiment of an output comparing process in accordance with the present invention.

FIG. 5 sets forth the process by which a preferred embodiment of the invention compares non-matching notification messages using a rule set. Software applications 100 generate output files 110, 105, or 107. Output files 110, 105, or 107 may be within software applications 100, standing alone, within a monitor process rules software 502, monitor process software 324, or otherwise.

Monitor process rules software 502 compares output from within output files 110, 105, or 107 using rule set 504. Rule set 504 preferably contains rules for determining when output, which may also be a notification message, is of a particular type. More preferably, rule set 504 contains rules for determining when notification messages alerting of an error are of a particular importance. Rule set 504 preferably is also flexible, not requiring identical matches between text within rule set 504 and the output from output files 110, 105, or 107. More preferably, rule set 504 contains rules that are textual strings, such as words or numbers, that are shorter that the textual string of notification messages. Rule set 504 may be within software applications 100, standing alone, within a monitor process rules software 502, monitor process software 324, or otherwise.

Monitor process rules software 502 compares output from within output files 110, 105, or 107 using rule set 504 preferably by searching through the textual string of the output. Such output preferably being a notification message. Such output more preferably being a notification message alerting about an error encountered by or created by a software application 100.

In an exemplary embodiment of the invention, monitor process rules software 502 compares the textual string from software application 100. Monitor process rules software 502 imports such textual string preferably through output files 110, 105, and/or 107. Once the textual string is imported into monitor process rules software 502, monitor process rules software 502 searches through the textual string of the notification message using each rule in rule set 504. For each rule, there is preferably a text or number associated with such rule. If the text or number associated with such rule is found in the textual string of a notification message, monitor process rules software 502 performs certain tasks commanded by such rule.

Further in this exemplary embodiment, such rule may include a partial severity between 0 and 99. Such rule may also include a partial contact list containing members. Preferably such rule has stored contact information regarding such members.

Further in this exemplary embodiment, monitor process rules software 502 continues comparing text and/or numbers associated with each rule in rules set 504 until all such text and numbers are determined to be or not to be within the textual string of the notification message.

Still further in this exemplary embodiment, monitor process rules software 502 compiles one or more partial severities. Further, monitor process rules software 502 compiles one or more members of one or more partial contact lists.

Also in this exemplary embodiment, monitor process rules software 502 adds, balances, or otherwise adjusts the one or more partial severities to generate a severity for the notification message. Also, monitor process rules software 502 adds the one or more members of the one or more partial contact lists into a contact list for the notification messages, preferably ignoring duplicative entries for members.

Monitor process rules software 502 exports the severity and contact list, shown as rules output 506. Exporting, step 506, may be performed by software applications 100, by monitor process rules software 502, by monitor process software 324, or otherwise. The severity and contact list for each notification message is preferably exported via a manager screen shown as step 438, email, work phones, cell phones, or through other communication devices.

Figure 6:
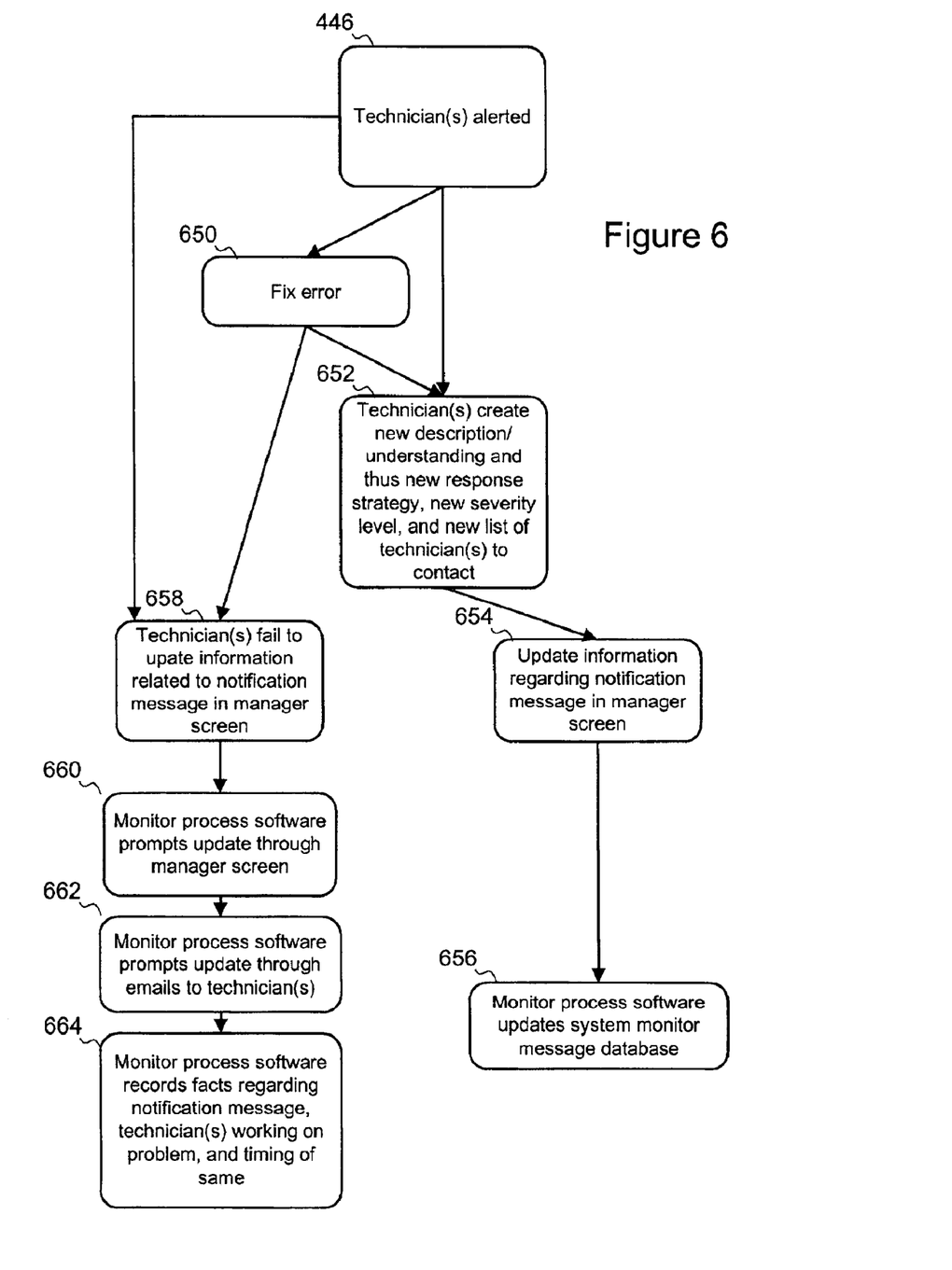
FIG. 6 is a flow diagram of a preferred embodiment of a management process in accordance with the present invention.

FIG. 6 sets forth the process by which the technicians and monitor process software 324 interact according to another aspect of the inventive monitor process. With the appropriate technician(s) alerted, step 446, the technician(s) fix the error to which the non-matching notification message refers, if applicable, step 650. Preferably concurrently, the technician(s) also record how they fixed the error and what information would be useful in fixing the error if it occurs again (step 652), such as severity level, persons to contact, and the most efficient method to fix the error as well as other details.

The monitor process provides a manner in which to easily record the information, preferably using manager screen 770 (see FIG. 7) according to step 654. The technician(s) fixing the error may enter their findings and suggestions easily, with a follow-along, easy-to-use graphical interface (such as manager screen 770) that prompts them to note each detail set forth above. This is preferably achieved through an input module comprising a table on a scrollable window 774 within manager screen 770 that allows for manual entry of the user's findings, suggestions, and modifications.

Figure 7:
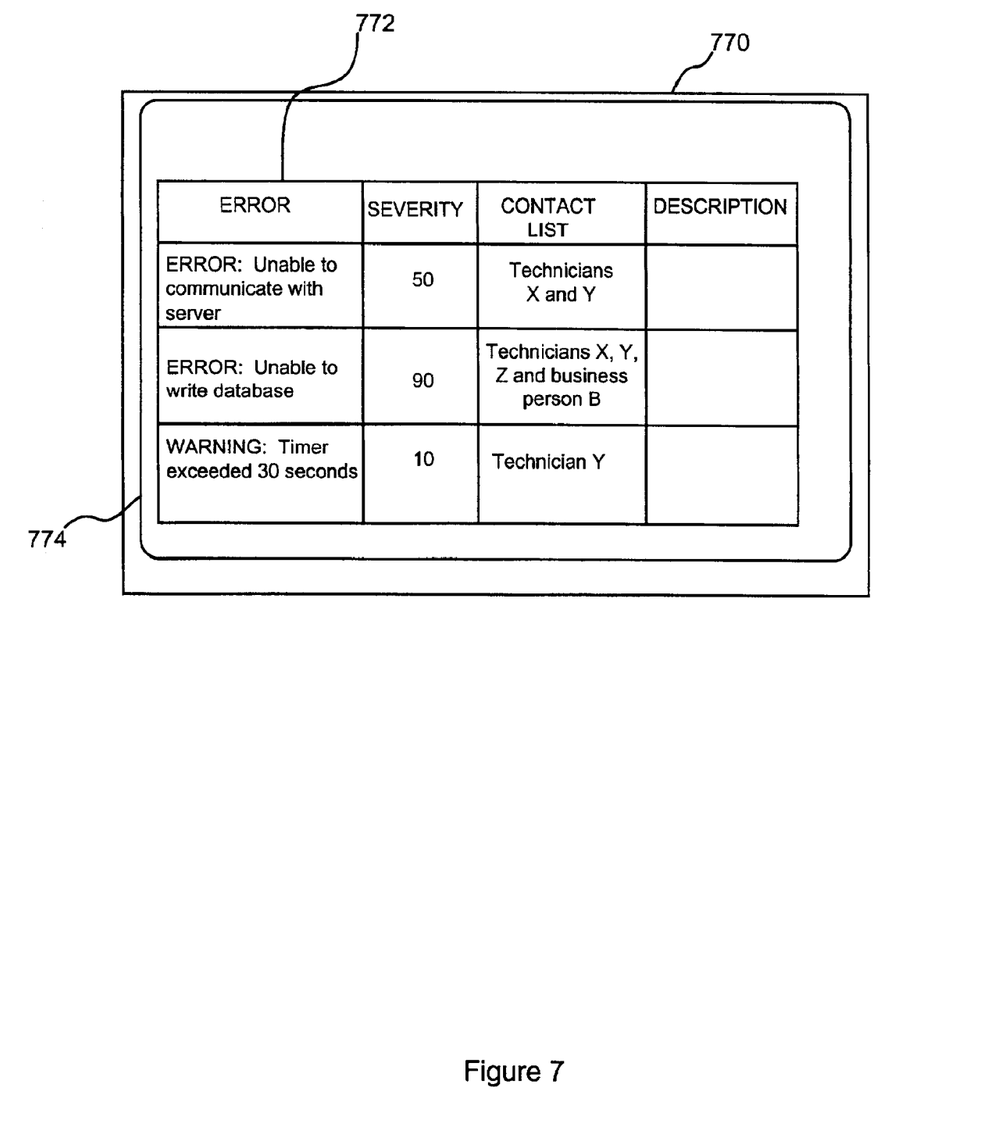
FIG. 7 is a schematic of a graphical user interface of a preferred embodiment in accordance with the present invention.

Manager screen 770 prompts technicians when they are entering information into the screen, requiring little effort from the technicians. Manager screen 770 includes the information regarding the non-matching notification message generated by monitor process software 324 as set forth in step 438. With the information already in manager screen fields 772, the technicians need only edit this information, as needed, such as by modifying the severity, modifying the contact list by adding or removing persons, and modifying by creating or filling in details a description of the error to which the non-matching notification message refers.

Once the information is entered into manager screen 770 (or through other means if necessary), monitor process software 324 records it into a record file using a recordation module. Monitor process software 324 then automatically updates the feedback message database for the software application 100 that generated the non-matching notification message so that the next time the same non-matching notification message is generated by that software application 100, monitor process software 324 will ignore it, leaving it for system monitor 122 to address.

Monitor process software 324 also updates system monitor 122's message database used for software application 100 that generated the non-matching notification message by creating an export file, according to step 656. The export file may be exported, preferably using an export module, in human-readable text for a technician to manually update the applicable system monitor's 122 message database, but preferably the export file automatically updates system monitor 122's message database without further human effort.

In some cases, either after fixing the error or without having fixed the error, the technician(s) alerted, step 446, fail to update the information relating to the non-matching notification message, step 658, within a certain time period. In such cases, monitor process software 324 encourages the alerted technician(s) by prompting them to update the information in the manager screen, step 660.

If the alerted technicians continue to fail to update the information within another time period, monitor process software 324 prompts the alerted technician(s) and any technicians not yet alerted that are members of the contact list generated according to step 436 through an email, pager, phone, or other device. If the technician(s) again fail to update the information on manager screen 770, monitor process software 324 records all facts regarding the non-matching notification message, technicians working on the error, if applicable, time and timing of the non-matching notification message, and then sends this information to a manager, preferably a manager set forth for that particular software application 100 in the rule set.

Figure 8:
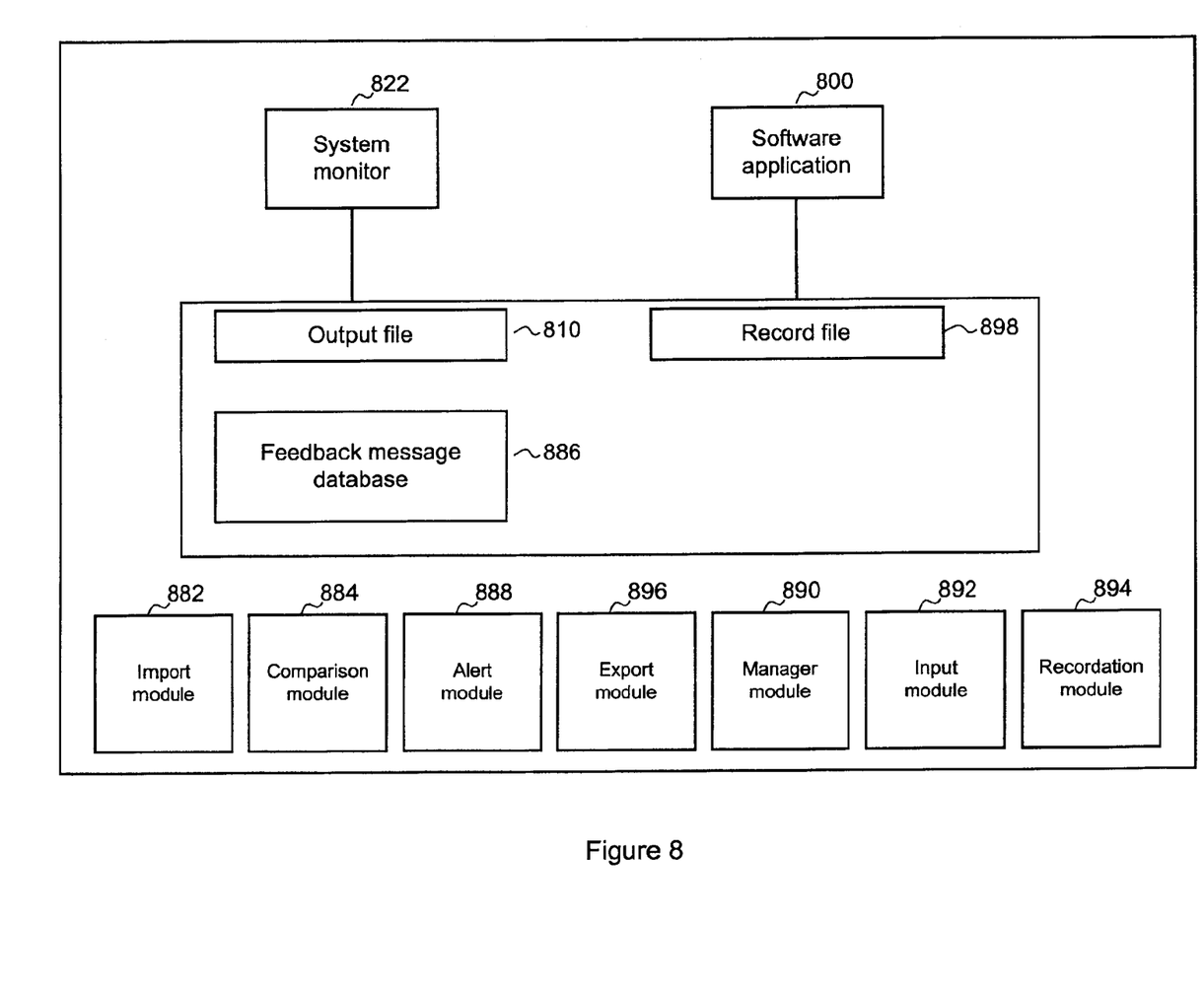
FIG. 8 is a schematic of a system in accordance with the present invention.

FIG. 8 sets forth a system interfacing to software application 800 and system monitor 822. The system includes output file 810, which contains notification messages generated by software application 800. Output file 810 may be retained within software application 800, system monitor 822, a database, or otherwise. Output file 810 is shown as set forth in FIG. 8 simply for ease in explaining the system.

The system also includes import module 882, which is configured to extract the notification messages from output file 810.

The system also includes comparison module 884, which is configured to compare the notification messages against feedback message database 886. Feedback message database 886 is preferably configured to a particular software application 800, but may be configured to more than one software application 800. Message database 886 may include many message databases, each configured to one or more software applications 800, but is shown in FIG. 8 as one database for clarity.

Comparison module 884 is configured to compare, and preferably is configured to determine, which notification messages are matching and which are non-matching notification messages. Comparison module 884 preferably is configured to compare each notification message within output file 810 against feedback message database 886. Preferably comparison module 884 is configured to be able to differentiate between notification message that are non-matching and matching. Preferably comparison module 884 is configured to differentiate textual notification messages from output file 810 against textual notification messages stored within feedback message database 886.

The system also includes an alert module 888. Alert module 888 preferably is configured to alert one or more users, technicians, or other persons or non-persons to non-matching notification messages. Alert module 888 preferably is also configured to include with the alert the text of the non-matching notification message. Further, alert module 888 preferably is also configured to include with the alert a contact list of the non-matching notification message. Further, alert module 888 preferably is also configured to include with the alert a severity of the non-matching notification message. Further still, alert module 888 preferably is also configured to include with the alert a description of the non-matching notification message. Even further still, alert module 888 preferably is also configured to alert members of the contact list.

The system further includes a manager module 890. Manager module 890 is preferably configured to communicate the non-matching notification messages. More preferably, manager module 890 is configured to communicate the non-matching notification messages through a graphical user interface. Even more preferably, manager module 890 is configured to communicate the non-matching notification messages in manager screen fields 772 in scrollable window 774 in graphical user interface or manager screen 770, as shown in FIG. 7.

The system further includes an input module 892. Input module 892 is preferably configured to modify a record of the non-matching notification message, preferably stored within feedback message database 886. Further, input module 892 more preferably is configured to receive information received from the one or more users, technicians, other persons, or non-persons. Further still, input module 892 is also preferably configured to alter the record of the non-matching notification message, preferably within feedback message database 886. Input module 892 may receive such information directly or indirectly through manual entry.

The system preferably also comprises a recordation module 894. Recordation module 894 preferably is configured for storing into a record file 898 information regarding modified non-matching notification messages.

The system preferably also includes an export module 896. Export module 896 preferably is configured to export modified non-matching notification messages, preferably contained within record file 898. Export module 896 is preferably also configured to export the modified non-matching notification message contained within the record file in a format acceptable to system monitor 822. Also, export module 896 is preferably also configured to export the modified non-matching notification message contained within the record file in a format acceptable to feedback message database 886. Preferably export module 896 is also configured to export the modified non-matching notification message in a human-readable format.

Record file 898, feedback message database 886, and output file 810 are separate in FIG. 8 to enable a clear discussion. These may be combined, partly, in total, or otherwise with the others or with modules 882, 884, 888, 896, 890, 892, 894, or otherwise.

Modules 882, 884, 888, 896, 890, 892, and 894 are separate in FIG. 8 to enable a clear discussion. They may be combined in part, in total, or otherwise with each other or with record file 898, feedback message database 886, or output file 810, or otherwise.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for managing error notification messages, the method comprising the steps of:

communicating with an output file of a software application to receive a non-matching notification message;

producing a severity level and a contact list using a rule set;

searching text of the non-matching notification message for terms included within the rule set;

matching the terms included within the rule set with predetermined contacts within the rule set; and communicating, to one or more members of the contact list, the severity level and the non-matching notification message.

2. The method recited in claim 1, further comprising the step of:

combining the matching predetermined contacts to produce the contact list for the non-matching notification message.

3. A system for interfacing to a system monitor, comprising:

an output file containing notification messages generated by a software application;

an import module to extract the notification messages from the output file;

a comparison module to compare the notification messages against a feedback message database corresponding to the software application to be monitored by the system monitor; and an alert module configured to alert one or more users to non-marching notification messages.

4. The system recited in claim 3, wherein the non-matching notification message is a notification message that does not match any entries within the feedback message database.

5. The system recited in claim 4, further comprising a manager module to communicate the non-matching notification messages.

6. The system recited in claim 5, wherein the manager module communicates the non-matching notification messages through a graphical user interface.

7. The system recited in claim 6, wherein the manager module communicates the non-matching notification messages in a table in a scrollable window in the graphical user interface.

8. The system recited in claim 5, further comprising an input module for the one or more users to modify the non-matching notification message, whereby, information received from the one or more users alters information associated with the non-matching notification message.

9. The system recited in claim 8, wherein the input module receives manual entry from the one or more users.

10. The system recited in claim 8, further comprising a recordation module for storing into a record file information regarding the modified non-matching notification message.

11. The system recited in claim 10, further comprising an export module configured to export the modified non-matching notification message contained within the record file.

12. The system recited in claim 11, wherein the export module exports the modified non-matching notification message contained within the record file in a format acceptable to a system monitor.

13. The system recited in claim 11, wherein the export module exports the modified non-matching notification message contained within the record file in a human-readable format.

* * * * *